(12) United States Patent
Yao et al.

(10) Patent No.: US 8,088,068 B2
(45) Date of Patent: Jan. 3, 2012

(54) MULTIPLE ULTRASOUND BEAMS TRANSMITTING AND RECEIVING METHOD AND APPARATUS

(75) Inventors: Bin Yao, Shenzhen (CN); Yong Jiang, Shenzhen (CN); Qinjun Hu, Shenzhen (CN); Bo Yang, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 1061 days.

(21) Appl. No.: 11/940,089

(22) Filed: Nov. 14, 2007

(65) Prior Publication Data
US 2008/0125656 A1    May 29, 2008

(30) Foreign Application Priority Data
Nov. 28, 2006    (CN) .......................... 2006 1 0157174

(51) Int. Cl.
*A61B 8/00* (2006.01)
(52) U.S. Cl. ........................ 600/437; 600/447
(58) Field of Classification Search ................. 600/437, 600/447, 443
See application file for complete search history.

(56) References Cited

U.S. PATENT DOCUMENTS

| | | |
|---|---|---|
| 4,542,653 A | 9/1985 | Liu |
| 5,369,624 A | 11/1994 | Fukukita et al. |
| 5,388,461 A | 2/1995 | Rigby |
| 5,487,389 A * | 1/1996 | Banjanin et al. ............... 600/455 |
| 5,544,128 A | 8/1996 | Kim et al. |
| 5,573,001 A | 11/1996 | Petrofsky et al. |
| 5,653,236 A | 8/1997 | Miller |
| 5,676,147 A | 10/1997 | Petrofsky et al. |
| 5,844,139 A | 12/1998 | Miller et al. |
| 5,984,869 A | 11/1999 | Chiao et al. |
| 6,029,116 A | 2/2000 | Wright et al. |
| 6,104,673 A | 8/2000 | Cole et al. |

(Continued)

FOREIGN PATENT DOCUMENTS
EP    0859242 A1    8/1998
(Continued)

OTHER PUBLICATIONS
China patent application No. 200610157174.4, Search Report dated Jul. 13, 2007.
(Continued)

*Primary Examiner* — Jacqueline Cheng
(74) *Attorney, Agent, or Firm* — Kory D. Christensen; Stoel Rives LLP

(57) ABSTRACT

This present application describes a multiple ultrasound beams transmitting and receiving method, comprising: transmitting a first fat beam along a first transmit line with a first transmit aperture; receiving echo of the first fat beam with a first receive aperture and forming data of a first group of receive lines; transmitting a second fat beam along a second transmit line with a second transmit aperture; receiving echo of the second fat beam with a second receive aperture and forming data of a second group of receive lines; constructing a full receive aperture by combining the first receive aperture and the second receive aperture, the full receive aperture centered in the area covering the first group of receive lines and the second group of receive lines; weighting a data of a receive line of the first group and a data of a receive line of the second group collinear with said receive of the first group respectively, and summing two weighted data.

20 Claims, 4 Drawing Sheets

U.S. PATENT DOCUMENTS

| | | | |
|---|---|---|---|
| 6,110,116 | A | 8/2000 | Wright et al. |
| 6,245,016 | B1 | 6/2001 | Daft et al. |
| 6,309,356 | B1 | 10/2001 | Ustuner et al. |
| 6,363,033 | B1 | 3/2002 | Cole et al. |
| 6,447,452 | B1 | 9/2002 | Liu et al. |
| 6,482,157 | B2 | 11/2002 | Robinson |
| 6,491,634 | B1 | 12/2002 | Leavitt et al. |
| 6,666,823 | B2 * | 12/2003 | Yao ............................. 600/443 |
| 7,011,632 | B2 | 3/2006 | Steinbacher et al. |
| 2002/0143253 | A1 | 10/2002 | Robinson |
| 2006/0241490 | A1 | 10/2006 | Lazenby |
| 2007/0167752 | A1 * | 7/2007 | Proulx et al. ................. 600/437 |
| 2009/0105592 | A1 | 4/2009 | Yao |

FOREIGN PATENT DOCUMENTS

WO　　WO 00/49427 A1　　8/2000

OTHER PUBLICATIONS

Hergum, Torbjorn, et al., Article entitled "Parallel Beamforming Using Synthetic Transmit Beams", IEEE Transactions on Ultrasonics, Ferroelectrics, and Frequency Control, vol. 54, No. 2, Feb. 2007, pp. 271-280.

Office Action mailed Sep. 1, 2010 in U.S. Appl. No. 11/876,781, filed Oct. 23, 2007.

Office Action mailed Apr. 25, 2011 in U.S. Appl. No. 11/876,781, filed Oct. 23, 2007.

* cited by examiner

MULTIPLE ULTRASOUND BEAMS TRANSMITTING AND RECEIVING METHOD AND APPARATUS

RELATED APPLICATIONS

The present application claims the priority of the Chinese Patent Application No. CN200610157174.4, entitled "MULTI-BEAM TRANSMITTING AND RECEIVING METHOD IN AN ULTRASOUND DIAGNOSTIC SYSTEM AND APPARATUS FOR THE SAME", filed on Nov. 28, 2006, which is incorporated herein by reference.

TECHNICAL FIELD

The invention relates to imaging technologies for medical ultrasound diagnostic systems, more particularly to a multiple ultrasound beams transmitting and receiving method and apparatus.

BACKGROUND TECHNOLOGY

It is important to study the fast imaging technique of an ultrasound diagnostic system. Implementation of the fast imaging lays a solid foundation for realizing some more advanced technologies. One of the advantages relates to a higher data rate. Larger amount of information obtained in a unit time guarantees a better and more accurate image analysis, thus enabling better executions of various techniques. In particular, the fast imaging technique plays a critical role in the following respects:

1. 3D/4D Imaging

A huge number of data is necessary for both 3D imaging and 4D imaging. Limitation in the imaging speed causes unfavorable effect to the 3D imaging.

2. Blood Flow Imaging

Like image quality, the frame rate of the blood flow imaging has a direct influence on the performance of an ultrasound imaging system, and is an important parameter for evaluating an ultrasound imaging system. Most of the mid-end and low-end ultrasound imaging systems have a relatively low frame rate of blood flow imaging, and can not be compared to the C mode frame rate of a high-end imaging system. Therefore, the ultrasound fast imaging is of great importance. In short, the principle of the ultrasound fast imaging is that data representing a plurality of scan lines are formed in response to one transmit beam. In other words, it is possible to realize a parallel acquisition of scan line data. As a result, the frame rate of the blood flow imaging of the ultrasound imaging system is significantly enhanced.

3. Heart Imaging

For the heart beating with relatively fast speed, the frame rate of an ultrasound imaging system is sometimes more important than the image quality.

4. Image Quality

The existing ultrasound imaging technologies are confronted with a problem of how to balance the image quality and the frame rate. For example:

i) Two beam transmissions can be used to form one scan line with high signal-to-noise ratio (SNR) in the synthetic aperture technique;

ii) The beams transmitted from different directions in different time are used for form scan lines to reduce speckles and increasing imaging quality in the complex imaging technique;

iii) With a coded excitation, the Golay code is transmitted for multiple times to minimize the influence of vertical side lobes;

iv) The high frame rate can be achieved with a low density scan in the B-mode heart imaging.

Imaging quality is improved at the expense of the frame rate in the items i)~iii), while the high frame rate sacrifices image quality in the item iv). There is a conflict between the frame rate and the image quality. With the ultrasound fast imaging, this conflict can be solved.

5. Heart Related Imaging Technologies

Many existing high-end ultrasound imaging systems relate to heart clinical technologies, such as the anatomical M-mode and cardiac motion analysis. All of them carry out clinical evaluations and index calculations based on the position variation of a certain part of a heart with time so that consecutive images and precise results can be obtained. Therefore, strict requirements are imposed on the temporal resolution of a heart image, i.e., the frame rate of the image.

To improve the frame rate, researchers start to focus on the multi-beam receive technique. In the multi-beam reception technique, multiple receive scan lines are formed in response to one beam transmission, and time for generating a frame of image is thus reduced and the frame rate is increased. In addition to the transmission of a fat beam, another technical challenge confronting the multi-beam reception technique is how to efficiently eliminate distortion of the receive scan lines, which is caused because the receive scan lines are located asymmetrically with respect to the sound field.

The U.S. Pat. No. 6,666,823 B2, entitled "Beam combination method and system", discloses a multi-beam receiving method, which superimposes the receive scan lines formed respectively in response to two adjacent transmissions to eliminate distortion of the receive scan lines. As shown in FIG. 1, TY1, TY2 and TY3 represent respectively three transmissions, four receive beams along four receive lines are received in response to one transmission. Two of the four receive beams in response to TY1 transmission and two of the four receive beams in response to TY2 transmission are overlapping, and the distortion may be removed by weighting and summing two receive beams along the same receive line.

However, although the above mentioned existing technology may correct distortion, it is realized at the cost of a reduced lateral resolution, because a fat beam has to be transmitted in order to balance energy, which causes the lateral resolution of the sound field to be reduced. To compensate for the decrease of resolution, a large receive aperture may be used, which, however, increases hardware cost.

SUMMARY OF THE INVENTION

The technical problem to be solved by the embodiments of the invention is to provide a multi-beam receiving method and apparatus, which achieves a higher lateral resolution at a lower hardware cost, and addresses the disadvantages of the above existing technologies.

The invention achieves this object by using a synthetic aperture technique to overcome a low lateral resolution, and using multiple beam technique to increase the frame rate.

In the first aspect of the embodiments of the invention, there is provided a multiple ultrasound beams transmitting and receiving method, comprising the steps of: transmitting a first fat beam along a first transmit line with a first transmit aperture; receiving echo of the first fat beam with a first receive aperture and forming data of a first group of receive lines; transmitting a second fat beam along a second transmit line with a second transmit aperture; receiving echo of the second fat beam with a second receive aperture and forming data of a second group of receive lines; constructing a full receive aperture by combining the first receive aperture and the second receive aperture, the full receive aperture centered in the area covering the first group of receive lines and the second group of receive lines; weighting a data of a receive line of the first group and a data of a receive line of the second group collinear with said receive of the first group respectively, and summing two weighted data.

In the second aspect of the embodiments of the invention, the multiple ultrasound beams transmitting and receiving method according to the first aspect of the embodiments of the invention, wherein weight of the data of said receive line of the first group is a function of distance from said receive line of the first group to the first transmit line, and weight of the data of said receive line of the second group is a function of distance from said receive line of the second group to the second transmit line, the shorter the distance, the larger the weight, and vice versa.

In the third aspect of the embodiments of the invention, the multiple ultrasound beams transmitting and receiving method according to the second aspect of the embodiments of the invention, wherein there are a number N of receive lines in each of the first group of receive lines and the second group of receive lines, N being a positive integer.

In the fourth aspect of the embodiments of the invention, the multiple ultrasound beams transmitting and receiving method according to the third aspect of the embodiments of the invention, wherein N is between 4 and 16.

In the fifth aspect of the embodiments of the invention, the multiple ultrasound beams transmitting and receiving method according to the third aspect of the embodiments of the invention, wherein the receive lines in the first group are equally spaced from one another and symmetrically distributed with respect to the central point of the first group of receive lines, and the receive lines in the second group are equally spaced from one another and symmetrically distributed with respect to the central point of the second group of receive lines.

In the sixth aspect of the embodiments of the invention, the multiple ultrasound beams transmitting and receiving method according to the fifth aspect of the embodiments of the invention, wherein the weight satisfies the following expressions: $W_1=1-W_N$, $W_2=1-W_{N-1}$, $W_3=1-W_{N-2}$, ..., $W_1$, $W_2$, $W_3$, ..., $W_N$ being weights for data of $1^{st}$, $2^{nd}$, $3^{rd}$, ..., $N^{th}$ receive lines respectively.

In the seventh aspect of the embodiments of the invention, the multiple ultrasound beams transmitting and receiving method according to the fifth aspect of the embodiments of the invention, wherein the first group of receive lines has four receive lines equally spaced from one another and symmetrically distributed with respect to the central point of the four receive lines, the second group of receive lines has four receive lines equally spaced from one another and symmetrically distributed with respect to the central point of the four receive lines, wherein weights of the data of the first group of receive lines are from right to left respectively: 0.125, 0.375, 0.625, 0.875, and weights of the data of the second group of receive lines are from right to left respectively: 0.875, 0.625, 0.375, 0.125.

In the eighth aspect of the embodiments of the invention, the multiple ultrasound beams transmitting and receiving method according to the first aspect of the embodiments of the invention, wherein both the first receive aperture and the second receive aperture are a half receive aperture.

In the ninth aspect of the embodiments of the invention, there is provided a multiple ultrasound beams transmitting and receiving apparatus, comprising: a transmit unit for transmitting a first fat beam along a first transmit line with a first transmit aperture and transmitting a second fat beam along a second transmit line with a second transmit aperture; a receive unit for receiving echo of the first fat beam with a first receive aperture to form data of a first group of receive lines, and receiving echo of the second fat beam with a second receive aperture to form data of a second group of receive lines; a processing unit for constructing a full receive aperture by combining the first receive aperture and the second receive aperture, the full receive aperture centered in the area covering the first group of receive lines and the second group of receive lines, and for weighting a data of a receive line of the first group and a data of a receive line of the second group collinear with said receive of the first group respectively, and summing two weighted data.

In the tenth aspect of the embodiments of the invention, the multiple ultrasound beams transmitting and receiving apparatus according to the ninth aspect of the embodiments of the invention, wherein weight of the data of said receive line of the first group is a function of distance from said receive line of the first group to the first transmit line, and weight of the data of said receive line of the second group is a function of distance from said receive line of the second group to the second transmit line, the shorter the distance, the larger the weight, and vice versa.

In the eleventh aspect of the embodiments of the invention, the multiple ultrasound beams transmitting and receiving apparatus according to the tenth aspect of the embodiments of the invention, wherein there are a number N of receive lines in each of the first group of receive lines and the second group of receive lines, N being a positive integer.

In the twelfth aspect of the embodiments of the invention, the multiple ultrasound beams transmitting and receiving apparatus according to the eleventh aspect of the embodiments of the invention, wherein N is between 4 and 16.

In the thirteenth aspect of the embodiments of the invention, the multiple ultrasound beams transmitting and receiving apparatus according to the eleventh aspect of the embodiments of the invention, wherein the receive unit is configured in such a way that the receive lines in the first group are equally spaced from one another and symmetrically distributed with respect to the central point of the first group of receive lines and the receive lines in the second group are equally spaced from one another and symmetrically distributed with respect to the central point of the second group of receive lines.

In the fourteenth aspect of the embodiments of the invention, the multiple ultrasound beams transmitting and receiving apparatus according to the thirteenth aspect of the embodiments of the invention, wherein the weight satisfies the following expressions: $W_1=1-W_N$, $W_2=1-W_{N-1}$, and $W_3=1-W_{N-2}$, ..., $W_1$, $W_2$, $W_3$, ..., $W_N$ being weights for data of $1^{st}$, $2^{nd}$, $3^{rd}$, ..., $N^{th}$ receive lines respectively.

In the fifteenth aspect of the embodiments of the invention, the multiple ultrasound beams transmitting and receiving apparatus according to the thirteenth aspect of the embodiments of the invention, wherein the first group of receive lines has four receive lines equally spaced from one another and symmetrically distributed with respect to the central point of the four receive lines, the second group of receive lines has four receive lines equally spaced from one another and symmetrically distributed with respect to the central point of the four receive lines, wherein weights of the data of the first group of receive lines are from right to left respectively: 0.125, 0.375, 0.625, 0.875, and weights of the data of the second group of receive lines are from right to left respectively: 0.875, 0.625, 0.375, 0.125.

In the sixteenth aspect of the embodiments of the invention, the multiple ultrasound beams transmitting and receiving apparatus according to the ninth aspect of the embodiments of the invention, 16. The multiple ultrasound beams transmitting and receiving apparatus according to claim 9, wherein both the first receive aperture and the second receive aperture are a half receive aperture.

In the seventeenth aspect of the embodiments of the invention, there is provided an ultrasound diagnostic system, comprising: a probe having a transmit unit for transmitting ultrasound beams along transmit lines in response to excitation signals and having a receive unit for receiving echoes of the transmitted ultrasound beams; a pulse generator for generating and supplying the excitation signals to the transmit unit; a transmit/receive switching unit for switching transmitting and receiving operations of the probe; a beamformer for forming scan line data from the echoes received by the receive unit of the probe using receive delay and receive apodization; a detector for generating envelope scan line data from the scan line data, and a digital scan converter for converting the envelope scan line data from the detector to other desired formats, wherein the transmit unit includes a first transmit aperture and a second transmit aperture, the first transmit aperture to transmit a first fat beam along the first transmit line, and the second transmit aperture to transmit a second fat beam along the second transmit line; the receive unit includes a first receive aperture and a second receive aperture, the first receive aperture to receive echo of the first fat beam along a first group of receive lines, and the second receive aperture to receive echo of the second fat beam along a second group of receive lines, the first receive aperture and the second receive aperture being combined to construct a full receive aperture centered in the area covering the first receive line and the second receive line; the beamformer forms data of a first group of receive lines based on the received echo of the first fat beam, form data of a second group of receive lines based on the received echo of the second fat beam, weighting a data of a receive line of the first group and a data of a receive line of the second group collinear with said receive of the first group respectively, and summing two weighted data, respectively, to obtain the scan line data.

In the eighteenth aspect of the embodiments of the invention, the ultrasound diagnostic system according to the seventeenth aspect of the embodiments of the invention, wherein there are a number N of receive lines in each of the first group of receive lines and the second group of receive lines, N ranging between 4 and 16.

In the nineteenth aspect of the embodiments of the invention, the ultrasound diagnostic system according to the eighteenth aspect of the embodiments of the invention, wherein the receive lines in the first group are equally spaced from one another and symmetrically distributed with respect to the central point of the first group of receive lines, and the receive lines in the second group are equally spaced from one another and symmetrically distributed with respect to the central point of the second group of receive lines.

In the twentieth aspect of the embodiments of the invention, the ultrasound diagnostic system according to the seventeenth aspect of the embodiments of the invention, wherein both the first receive aperture and the second receive aperture are a half receive aperture.

Compared to the existing technologies, the advantages of the multi-beam transmitting and receiving method and apparatus for an ultrasound diagnostic system according to the embodiments of the invention are that the merits of the synthetic aperture and the distortion elimination with the multi-beam technique are combined, thereby enhancing the imaging frame rate of the ultrasound diagnostic system while still promising a desired lateral resolution.

DETAILED DESCRIPTION OF THE INVENTION

The apparatus and method according to the embodiments of the invention will be described hereunder in details with reference to the accompanying drawings and the embodiments illustrated in the accompanying drawings.

Figure 1:
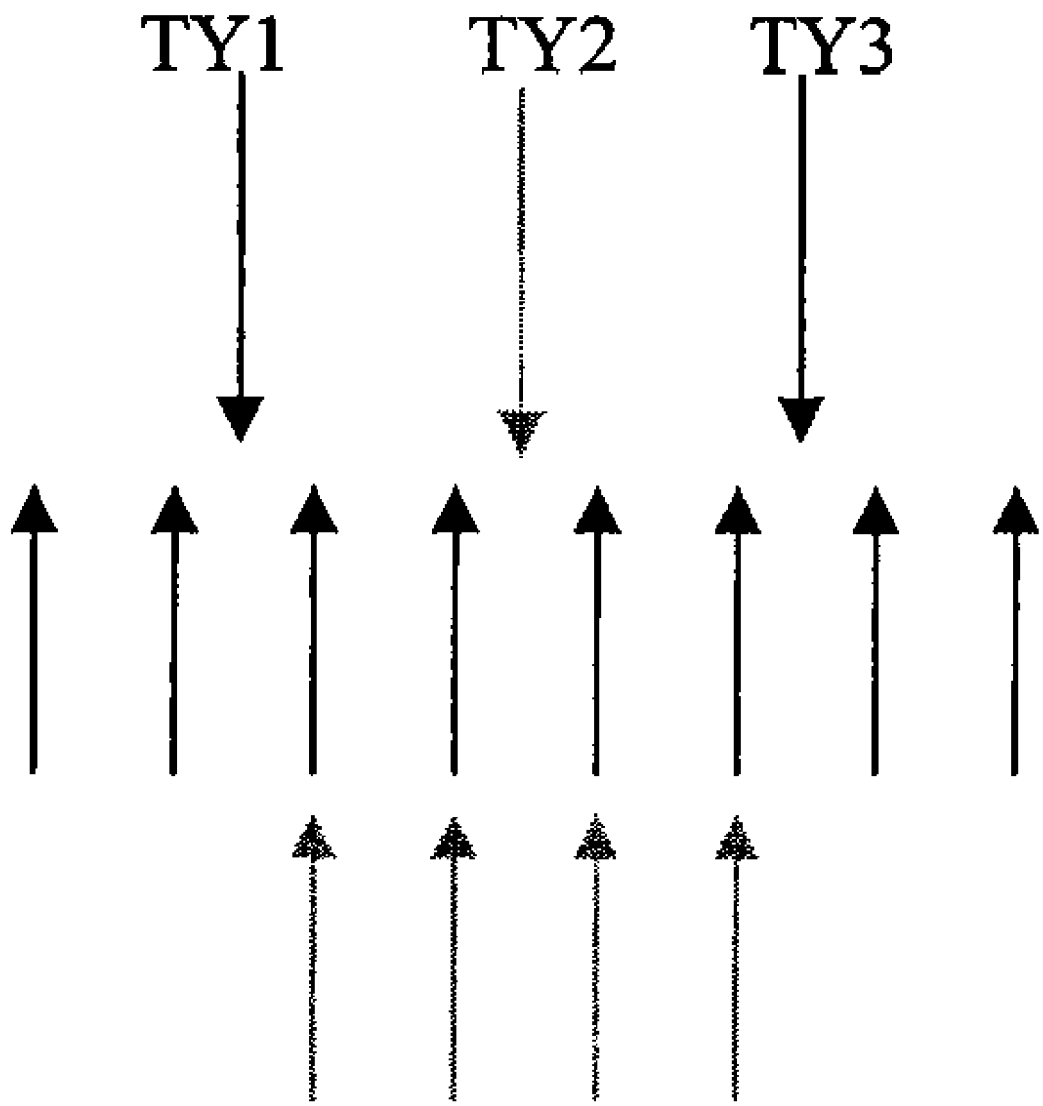
FIG. 1 is a schematic diagram illustrating distortion elimination by multiple beam technique in an existing ultrasound imaging system.
Figure 2:
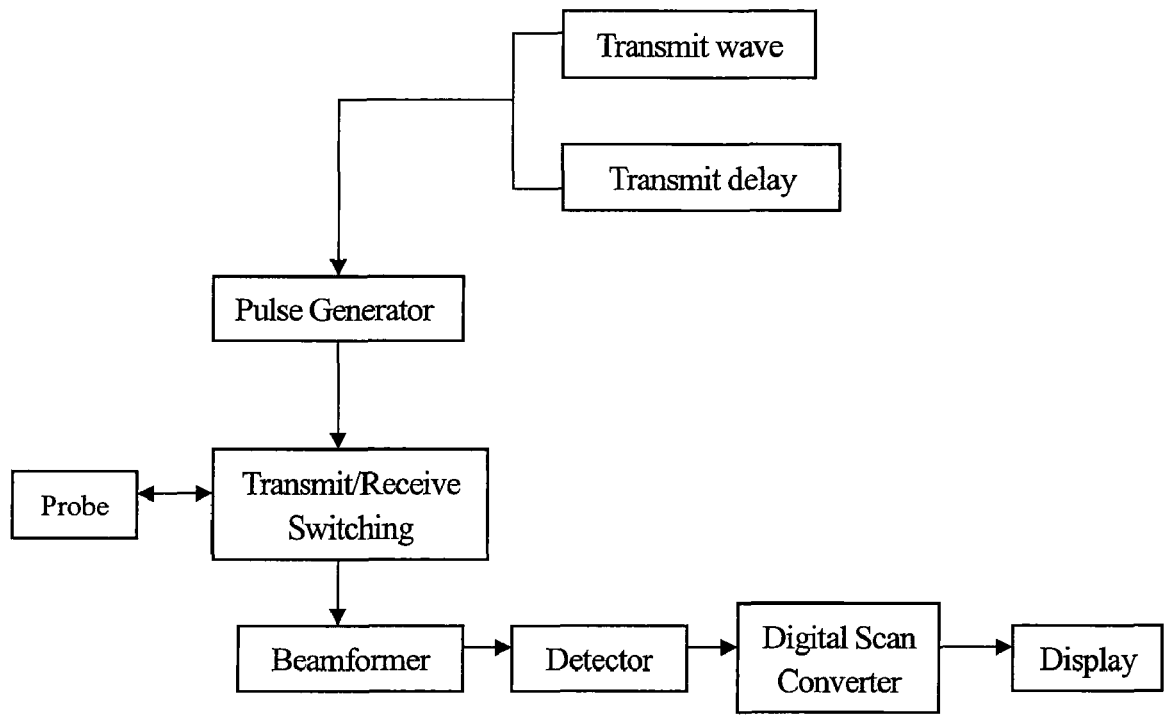
FIG. 2 is a functional block diagram of an ultrasound imaging system which can be used to implement the embodiments of the invention.

FIG. 2 is a functional block diagram of an ultrasound imaging system which can be used to implement the embodiments of the invention. A pulse generator activates each array element of a probe to transmit a beam based on the transmit wave and transmit delay. A tissue reflects the transmitted beam as echoes, and the echoes, having been received and detected by the array elements at the receive aperture of the probe, are transmitted to a beamformer, which combines the echoes into data of single scan line based on receive delays and apodization. The envelope data of the scan line is thereafter derived from the data of the scan line by a detector. The detector is also operable to perform sub-sampling and logarithmic compression, etc. Subsequently, a digital scan converter formats the envelope data in polar coordinate form into the rectangular coordinate format to be displayed by a display. Above are general descriptions to a single-beam. For multi-beams, the beamformer generates multiple scan lines in parallel in response to one transmission, thus greatly increasing the frame rate of the ultrasound imaging system. For multi-beams, the following problems should be addressed.

One problem is that a fat beam needs to be transmitted. To ensure enough energy at the receive lines, the sound field of the fat beam is required to have energy that is strong enough at the receive lines. If the sound field can not spatially cover all of the receive lines, the energy of some receive lines may vary, thus causing a distorted image. Therefore, for multi-beams, a sound beam that is wide enough is required to be transmitted, such that the major energy of the sound field is strong enough to spatially cover the receive lines. Transmission of a fat beam may be implemented, for example, by reducing a transmit aperture, using a non-strong focusing delay curve, or employing a transmit apodization.

Figure 3:
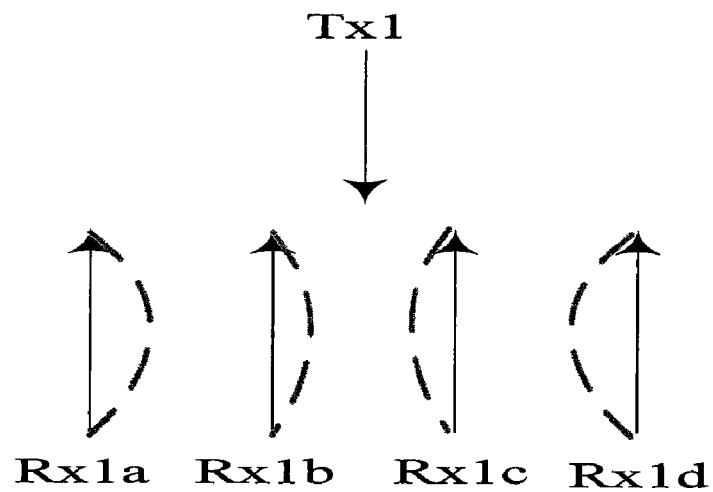
FIG. 3 is a schematic diagram illustrating distortion occurring during the multiple beam reception.

Another problem relates to distortion. As shown in FIG. 3, for example, four receive beams along the four receive lines Rx1a~Rx1d are received for a transmit beam along the transmit line Tx1. The center of the sound field of the transmit beam is located where the transmit line Tx1 is situated. Distortion is caused due to the asymmetry of the sound field in the four receive lines after beamforming. The obtained scan lines are curved lines, as indicated by the dotted lines in FIG. 3. Since Rx1a and Rx1d are located at a farther distance from Tx1, the distortions corresponding to Rx1a and Rx1d are more severe than those corresponding to Rx1b and Rx1c. In addition, as Rx1a~Rx1d located at different directions with respect to the transmit line Tx1, the distortion direction corresponding to Rx1a and Rx1b is opposite to that corresponding to Rx1c and Rx1d.

A yet further problem with the multi-beams is a reduced lateral resolution. The multi-beam reception technology requires transmission of a fat beam, but a broad sound field of the fat beam results in reduction of the lateral resolution. In principle, this problem may be addressed by increasing the receive aperture.

The fourth problem relates to the cost for manufacturing the ultrasound imaging system. The multi-beam technique demands a parallel processing, so more resources are required. Besides, to increase the receive aperture for compensating the lowered lateral resolution, more channels are need, which also contributes to the high cost for manufacturing the ultrasound imaging system.

To solve the conflict between the cost of the ultrasound imaging system and the image quality, the invention makes use of a synthetic aperture as well as eliminating distortion by overlapping multiple beams. Whereby, the frame rate can be increased by overlapping multiple beams, and meanwhile the insufficiency of the lateral resolution is overcome at the result of synthetic aperture. In general, two scan lines that are distorted in reverse directions are overlapped to reduce or eliminate distortion with multi-beams, therefore decreasing the frame rate by half. As to the synthetic aperture technique, two transmissions are demanded, and thus two scan lines that are distorted in reverse directions can be formed with a right half aperture and a left half aperture respectively and combined as a scan line without distortion, also decreasing the frame rate by half. That is, in general, using both synthetic aperture and multi-beam techniques simultaneously results in a quarter of the original frame rate. If eight receive beams are formed for a transmit beam, the frame rate will decrease by half only, because the multi-beam technology of the embodiments of the invention uses a synthetic aperture to compensate for the reduced resolution. In other words, if eight receive beams are formed for a transmit beam, what is really obtained will be a four-beam imaging.

Figure 4:
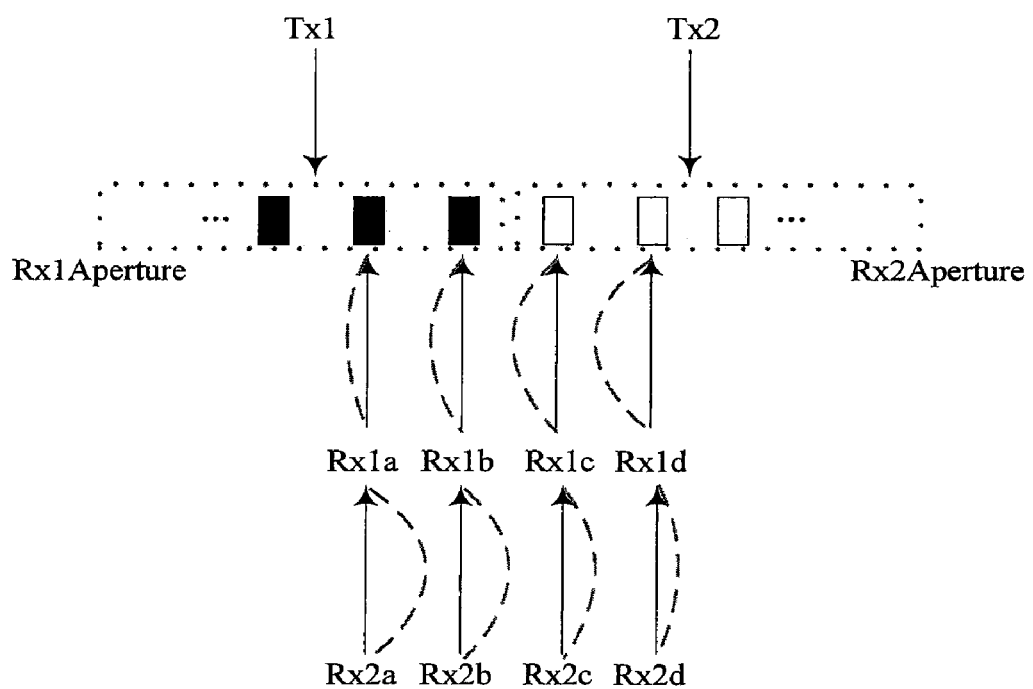
FIG. 4 is a schematic diagram illustrating the multi-beam receiving method according to the embodiments of the invention.

Hereunder, the technical solutions according to the embodiments of the invention will be more particularly illustrated taking "four receive beams formed for one transmit beam" as an example. As shown in FIG. 4, a fat beam is first transmitted along the transmit line Tx1 with a transmit aperture, and the corresponding receive beams are formed along receive lines Rx1a~Rx1d. A second fat beam is then transmitted along Tx2 with the transmit aperture, and the corresponding receive beams are formed along receive lines Rx2a~Rx2d, which are co-linear with Rx1a~Rx1d respectively.

To obtain a desired lateral resolution while saving cost, only half aperture is used for receiving a transmit beam. As shown in FIG. 4, one half aperture, the half of the receive aperture Rx1Aperture, is used to receive the Tx1 transmission, the array elements being indicated by the dark solid rectangles. Another half aperture, the half of the receive aperture Rx2Aperture, is used to receive the Tx2 transmission, indicated by rectangle with black sides. These two half apertures form a complete receive aperture, the center of which is at the midpoint of the area where all receive lines are distributed.

Distortion depends on the position relationship between the sound field of the transmit beam and the receive lines. Therefore, using a half aperture for receiving beams does not influence the distortion directions of the receive lines. As shown in the figure, each of the receive lines is accompanied with a dotted line, which denotes the distortion direction of each of these receive lines. It can be seen that distortions vary from one another in direction and magnitude because the receive lines are at different positions with respect to the transmit line. The distortion direction of the receive lines Rx1a~Rx1d is opposite to that of the receive lines Rx2a~Rx2d. This distortion can be ameliorated by weighing and summing technique. For example, it is assumed that the weights corresponding to the four receive lines Rx1a~Rx1d are respectively $W_1, W_2, W_3, W_4$. According to the symmetry, there are in fact only two weights, because $W_1=1-W_4$ and $W_2=1-W_3$. As to the four-beam reception with equally spaced receive lines as shown in FIG. 4, the weights may be 0.125, 0.375, 0.625, 0.875. Thus, in general, if N receive beams are formed for each transmit beam, the number of required weights is [N/2+0.5], wherein [ ] is representative of rounding. The setting of specific weight may be done in a variety of ways, for example, a weight may be the ratio of the distance between a receive line Rx1a~Rx1d and respective transmit line Tx1 to the distance between another collinear receive line Rx2a~Rx2d and the adjacent transmit line Tx2. A main consideration for the setting of weights should be given to the distance of each receive line with respect to respective transmit line. Taking two lines Rx1a and Rx2a as an example, the distortion of Rx1a is smaller than that of Rx2a, therefore the weight of Rx1a should be larger than that of Rx2a.

As shown in FIG. 4, a left half aperture reception is used in response to a left beam transmission, and a right half aperture reception is used in response to a right beam transmission. As a matter of fact, it is also feasible that a left half aperture reception is used in response to a right beam transmission, and a right half aperture reception is used in response to a left beam transmission.

FIG. 4 illustrates a method for obtaining four receive beams corresponding to four receive lines. Specifically, a fat beam is transmitted at the left side of the area of the four receive lines, which should have enough energy to cover the area. The left half receive aperture of the complete receive aperture centered on the midpoint of the area is used for receiving echo along the four receive lines in response to the transmission of the fat beam. A beamformer then forms first four receive beams. Similarly, another fat beam is transmitted at the right side of the area, and the right half receive aperture of the complete receive aperture is used for receiving echo along the four receive lines in response to the transmission of the another fat beam. The beamformer forms second four receive beams co-linear with the first four receive beams. Finally, the first four receive beams and the second four receive beams are weighted respectively and combined to obtain the final four receive scan lines which are equal to four receive scan lines obtained by means of a complete aperture.

Figure 5:
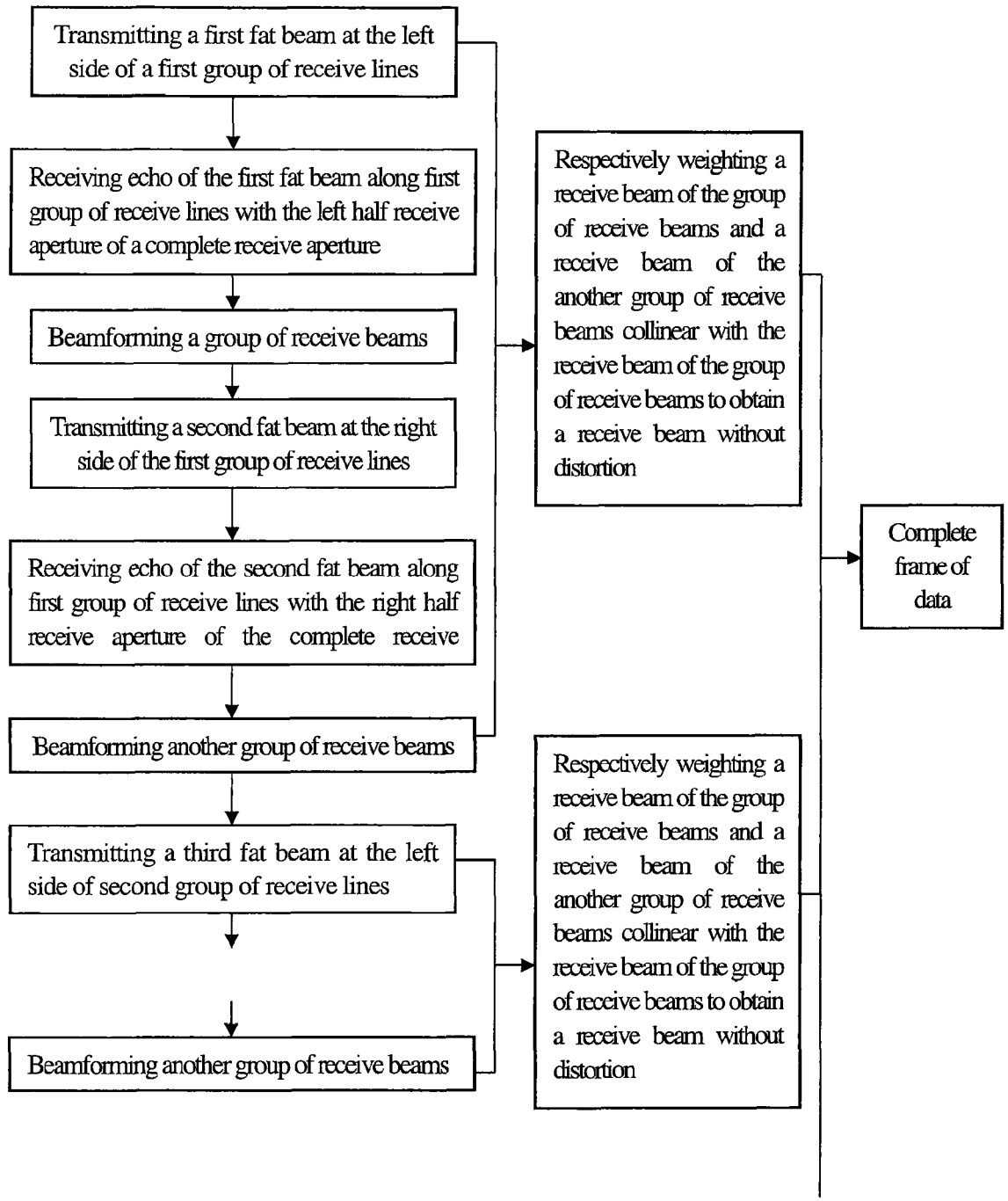
FIG. 5 is a schematic flow chart of forming a complete frame of data using the multi-beam receiving method according to the embodiments of the invention.

FIG. 5 is a flow chart for obtaining a complete frame of data. Specifically, all of receive lines are grouped based on the number of receive beams formed for each transmit beam. Two fat beam transmissions and two half receive apertures are needed for forming a set of data of a group of receive lines and another set of data of the group of receive lines respectively, as shown in FIG. 4. Finally, the set of data and the another set of data are weighted respectively and summed to eliminate distortion, thereby obtaining a group of scan lines corresponding to the complete receive aperture with distortion eliminated. As each set of data of respective group of receive lines is obtained only by means of two transmissions, if the number of receive lines in each group is N, the number of receive lines for a frame of image is T×N, then there may be T groups of receive lines, and the number of beam transmissions is (T×N)/N×2=2T. Suppose N=8, a frame of image has 128 receive lines (i.e., T=16), and each frame of image demands 32 beam transmissions. Therefore, the frame rate is four times of the frame rate by a single-beam transmission. If a synthetic aperture technique is employed simultaneously, the frame rate may be eight times as compared with the single-beam technique.

Although the embodiments of the invention has been described above with reference to specific embodiments thereof, it is not intended that the embodiments of the invention be limited to the above-mentioned embodiments. Various modifications and alternations may be made to the embodiments of the invention without departing from the spirit of the embodiments of the invention. The scope of the embodiments of the invention is defined by the appended claims.

What is claimed is:

1. A multiple ultrasound beams transmitting and receiving method, the method performed by an ultrasound imaging system including a transmit unit, a receive unit, and a processing unit, the method comprising the steps of:
    transmitting, using the transmit unit of the ultrasound imaging system, a first wide beam along a first transmit line with a first transmit aperture, wherein the first transmit line is located at a first side of a group of receive lines;
    receiving, using the receive unit of the ultrasound imaging system, echo of the first wide beam with a first receive aperture and forming a first set of receive beams respectively along the group of receive lines such that the first transmit line is located at a first side of all receive beams formed from the echo of the first wide beam;
    transmitting, using the transmit unit of the ultrasound imaging system, a second wide beam along a second transmit line with a second transmit aperture, wherein the second transmit line is located at a second side of the group of receive lines;
    receiving, using the receive unit of the ultrasound imaging system, echo of the second wide beam with a second receive aperture and forming a second set of receive beams respectively along the group of receive lines such that the second transmit line is located at a second side of all receive beams formed from the echo of the second wide beam, wherein the second side of all receive beams formed from the echo of the second wide beam is an opposite side to the first side of all receive beams formed from the echo of the first wide beam;
    constructing, using the processing unit of the ultrasound imaging system, a full receive aperture by combining the first receive aperture and the second receive aperture, the full receive aperture centered in the area covering the group of receive lines along which the first set of receive beams and the second set of receive beams are formed; and
    weighting, using the processing unit of the ultrasound imaging system, collinear data along a first receive line of the group of receive lines from both the first set of receive beams and the second set of receive beams, and summing the two weighted data.

2. The multiple ultrasound beams transmitting and receiving method according to claim 1, wherein weight of the data along the first receive line corresponding to the first set of receive beams is a function of distance from the first receive line to the first transmit line, and weight of the data along the first receive line corresponding to the second set of receive beams is a function of distance from the first receive line to the second transmit line, the shorter the distance, the larger the weight, and vice versa.

3. The multiple ultrasound beams transmitting and receiving method according to claim 2, wherein there are a number N of receive lines in the group of receive lines, N being a positive integer.

4. The multiple ultrasound beams transmitting and receiving method according to claim 3, wherein N is between 4 and 16.

5. The multiple ultrasound beams transmitting and receiving method according to claim 3, wherein the receive lines in the group are equally spaced from one another and symmetrically distributed with respect to the central point of the group of receive lines.

6. The multiple ultrasound beams transmitting and receiving method according to claim 5, wherein the weight satisfies the following expressions: $W_1=1-W_N$, $W_2=1-W_{N-1}$, $W_3=1-W_{N-2}$, ..., $W_1$, $W_2$, $W_3$, ..., $W_N$ being weights for data of $1^{st}$, $2^{nd}$, $3^{rd}$, ..., $N^{th}$ receive lines respectively.

7. The multiple ultrasound beams transmitting and receiving method according to claim 5, wherein the group of receive lines has four receive lines equally spaced from one another and symmetrically distributed with respect to the central point of the four receive lines, wherein weights of the data of the first set of receive beams respectively formed along the group of receive lines are from right to left respectively: 0.125, 0.375, 0.625, 0.875, and weights of the data of the second set of receive beams respectively formed along the group of receive lines are from right to left respectively: 0.875, 0.625, 0.375, 0.125.

8. The multiple ultrasound beams transmitting and receiving method according to claim 1, wherein both the first receive aperture and the second receive aperture are a half receive aperture with respect to the full receive aperture.

9. A multiple ultrasound beams transmitting and receiving apparatus, comprising:
    a transmit unit configured to transmit a first wide beam along a first transmit line with a first transmit aperture and configured to transmit a second wide beam along a second transmit line with a second transmit aperture, wherein the first transmit line is located at a first side of a group of receive lines and the second transmit line is located at a second side of the group of receive lines;
    a receive unit configured to receive echo of the first wide beam with a first receive aperture to form a first set of receive beams respectively along the group of receive lines such that the first transmit line is located at a first side of all receive beams formed from the echo of the first wide beam, and configured to receive echo of the second wide beam with a second receive aperture to form a second set of receive beams respectively along the group of receive lines such that the second transmit line is located at a second side of all receive beams formed from the echo of the second wide beam, wherein the second side of all receive beams formed from the echo of the second wide beam is an opposite side to the first side of all receive beams formed from the echo of the first wide beam; and
    a processing unit configured to construct a full receive aperture by combining the first receive aperture and the second receive aperture, the full receive aperture centered in the area covering the group of receive lines along which the first set of receive beams and the second group of receive lines are formed, and configured to weight collinear data along a first receive line of the group of receive lines from both the first set of receive beams and the second set of receive beams, and configured to sum the two weighted data.

10. The multiple ultrasound beams transmitting and receiving apparatus according to claim 9, wherein weight of the data along the first receive line corresponding to the first set of receive beams is a function of distance from the first receive line to the first transmit line, and weight of the data along the first receive line corresponding to the second set of receive beams is a function of distance from the first receive line to the second transmit line, the shorter the distance, the larger the weight, and vice versa.

11. The multiple ultrasound beams transmitting and receiving apparatus according to claim 10, wherein there are a number N of receive lines in the group of receive lines, N being a positive integer.

12. The multiple ultrasound beams transmitting and receiving apparatus according to claim 11, wherein N is between 4 and 16.

13. The multiple ultrasound beams transmitting and receiving apparatus according to claim 11, wherein the receive unit is configured in such a way that the receive lines in the group of receive lines are equally spaced from one another and symmetrically distributed with respect to the central point of the group of receive lines.

14. The multiple ultrasound beams transmitting and receiving apparatus according to claim 13, wherein the weight satisfies the following expressions: $W_1=1-W_N$, $W_2=1-W_{N-1}$, and $W_3=1-W_{N-2}, \ldots, W_1, W_2, W_3, \ldots, W_N$ being weights for data of $1^{st}, 2^{nd}, 3^{rd}, \ldots, N^{th}$ receive lines respectively.

15. The multiple ultrasound beams transmitting and receiving apparatus according to claim 13, wherein the group of receive lines has four receive lines equally spaced from one another and symmetrically distributed with respect to the central point of the four receive lines, wherein weights of the data of the first set of receive beams respectively formed along the group of receive lines are from right to left respectively: 0.125, 0.375, 0.625, 0.875, and weights of the data of the second set of receive beams respectively formed along the group of receive lines are from right to left respectively: 0.875, 0.625, 0.375, 0.125.

16. The multiple ultrasound beams transmitting and receiving apparatus according to claim 9, wherein both the first receive aperture and the second receive aperture are a half receive aperture with respect to the full receive aperture.

17. An ultrasound diagnostic system, comprising:
a probe having a transmit unit configured to transmit ultrasound beams along transmit lines in response to excitation signals and having a receive unit configured to receive echoes of the transmitted ultrasound beams;
a pulse generator configured to generate and supply the excitation signals to the transmit unit;
a transmit/receive switching unit configured to switch transmitting and receiving operations of the probe;
a beamformer configured to form scan line data from the echoes received by the receive unit of the probe using receive delay and receive apodization;
a detector configured to generate envelope scan line data from the scan line data, and
a digital scan converter configured to convert the envelope scan line data from the detector to other desired formats;
wherein:
the transmit unit includes a first transmit aperture and a second transmit aperture, the first transmit aperture configured to transmit a first wide beam along a first transmit line, and the second transmit aperture configured to transmit a second wide beam along a second transmit line, wherein the first transmit line is located at a first side of a group of receive lines and the second transmit line is located at a second side of the group of receive lines;
the receive unit includes a first receive aperture and a second receive aperture, the first receive aperture configured to receive echo of the first wide beam along the group of receive lines, and the second receive aperture configured to receive echo of the second wide beam along the group of receive lines, the first receive aperture and the second receive aperture being combined to construct a full receive aperture centered in the area covering the group of receive lines; and
the beamformer further configured to form a first set of receive beams respectively along the group of receive lines based on the received echo of the first wide beam such that the first transmit line is located at a first side of all receive beams formed from the echo of the first wide beam, to form a second set of receive beams respectively along the receive lines based on the received echo of the second wide beam such that the second transmit line is located at a second side of all receive beams formed from the echo of the second wide beam, wherein the second side of all receive beams formed from the echo of the second wide beam is an opposite side to the first side of all receive beams formed from the echo of the first wide beam, to weight collinear data along a first receive line of the group of receive lines from both the first set of receive beams and the second set of receive beams, and to sum the two weighted data, respectively, to obtain the scan line data.

18. The ultrasound diagnostic system according to claim 17, wherein there are a number N of receive lines in the group of receive lines, N ranging between 4 and 16.

19. The ultrasound diagnostic system according to claim 18, wherein the receive lines in the group of receive lines are equally spaced from one another and symmetrically distributed with respect to the central point of the group of receive lines.

20. The ultrasound diagnostic system according to claim 17, wherein both the first receive aperture and the second receive aperture are a half receive aperture with respect to the full receive aperture.

* * * * *